United States Patent [19]
Rowe

[11] Patent Number: 6,061,876
[45] Date of Patent: May 16, 2000

[54] TEXTILE RECYCLING MACHINE

[75] Inventor: Robert G. Rowe, Mauldin, S.C.

[73] Assignee: John D. Hollingsworth on Wheels, Inc., Greenville, S.C.

[21] Appl. No.: 09/096,409

[22] Filed: Jun. 11, 1998

Related U.S. Application Data

[60] Provisional application No. 60/049,311, Jun. 11, 1997.

[51] Int. Cl.[7] .................................................. D01G 15/00
[52] U.S. Cl. ................................... 19/98; 19/101; 19/107; 241/160
[58] Field of Search ............................... 19/98, 100, 101, 19/104, 105, 107, 112, 113, 114, 218, 99, 65 R, 66 R, 200, 202, 203, 204, 205, 106 R, 110; 451/190, 194, 541, 542, 543, 544, 545, 546, 547; 241/160

[56] References Cited

U.S. PATENT DOCUMENTS

| | | |
|---|---|---|
| 133,638 | 12/1872 | Ferguson . |
| 1,235,949 | 8/1917 | Whitin . |
| 2,879,549 | 3/1959 | Miller et al. ................................ 19/104 |
| 3,057,020 | 10/1962 | McLeod . |
| 3,256,569 | 6/1966 | Draver .................................... 19/156.4 |
| 3,289,266 | 12/1966 | Brown et al. . |
| 3,483,598 | 12/1969 | Bryan ........................................ 19/105 |
| 3,605,196 | 9/1971 | Wise et al. . |
| 3,653,094 | 4/1972 | Fairfield . |
| 3,797,073 | 3/1974 | Fairfield . |
| 3,867,741 | 2/1975 | Frolov et al. ......................... 19/106 R |
| 3,941,530 | 3/1976 | Platt . |
| 3,992,755 | 11/1976 | Bonalumi .............................. 19/106 R |
| 3,999,250 | 12/1976 | Brown et al. ............................. 19/155 |
| 4,126,914 | 11/1978 | Winch et al. . |
| 4,217,680 | 8/1980 | Hollaway, Jr. et al. . |
| 4,219,908 | 9/1980 | Winch et al. . |
| 4,300,267 | 11/1981 | Winch et al. .............................. 19/200 |
| 4,438,547 | 3/1984 | Schmolke et al. .......................... 19/98 |
| 4,475,271 | 10/1984 | Lovgren et al. ........................... 19/105 |
| 4,484,377 | 11/1984 | Morel . |
| 4,599,766 | 7/1986 | Wirth ..................................... 19/106 R |
| 4,706,338 | 11/1987 | Anspach ..................................... 19/105 |
| 4,807,480 | 2/1989 | O'Neill et al. ........................ 73/861.04 |
| 4,852,217 | 8/1989 | Bernhardt et al. . |
| 4,884,320 | 12/1989 | Gasser et al. ......................... 19/106 R |
| 4,967,946 | 11/1990 | Gasser et al. .............................. 226/25 |
| 5,007,137 | 4/1991 | Graute ...................................... 19/296 |
| 5,289,618 | 3/1994 | Fehrer ....................................... 19/304 |
| 5,313,688 | 5/1994 | Leifeld et al. ............................. 19/107 |
| 5,331,801 | 7/1994 | Heifetz . |
| 5,365,762 | 11/1994 | Thompson .................................. 72/53 |
| 5,481,864 | 1/1996 | Wright . |
| 5,517,726 | 5/1996 | Beier ......................................... 19/296 |
| 5,546,635 | 8/1996 | Leifeld ...................................... 19/200 |
| 5,584,101 | 12/1996 | Brabant et al. ........................... 19/304 |
| 5,613,278 | 3/1997 | Temburg ................................... 19/105 |
| 5,636,411 | 6/1997 | Greis et al. ............................... 19/157 |

FOREIGN PATENT DOCUMENTS

| | | |
|---|---|---|
| 41 26 625 A1 | 8/1991 | Germany . |
| 5-239721 | 7/1993 | Japan . |

*Primary Examiner*—John J. Calvert
*Assistant Examiner*—Gary L. Welch
*Attorney, Agent, or Firm*—Leatherwood Walker Todd & Mann, P.C.

[57] ABSTRACT

A textile fiber recycling machine for reprocessing hard thread waste, woven and non-woven fabrics, carpets, rugs, and the like. Material to be recycled is fed in pieces, or in roll form, into the machine. The machine includes a plurality of wire wound rolls positioned adjacent to one another and operating at successively higher rotational speeds from the inlet side to the outlet side of the machine. Closely spaced adjacent the rollers are carding segments. The rollers downstream of the entry roller include pairs of carding segments, with the leading carding segment being wire clothed, and the trailing carding segment being covered with a granular covering, such as sandpaper. The machine outputs open, usable fibers which can be used in subsequent conventional textile processes. A method of attaching sandpaper to a carding segment is also disclosed.

19 Claims, 5 Drawing Sheets

TEXTILE RECYCLING MACHINE

This application claims the benefit of U.S. Provisional Application Ser. No. 60/049,311, filed Jun. 11, 1997.

BACKGROUND OF THE INVENTION

This invention relates generally to a machine for recycling textile materials such as threads, fabric, and the like, into reusable fibers.

Often in textile manufacturing it becomes necessary to scrap products for one reason or another. For example, it could be that the products, once manufactured, did not meet the desired specifications, or perhaps, the product was not as marketable as anticipated. Because such scrap products may not readily be reworked or reprocessed, they may be sold as scrap for a fraction of their potential value, or disposed of altogether. Disposing of the scrap products is undesirable in that disposal costs are incurred, and additional valuable landfill space may be consumed.

Accordingly, it would be desirable to have a method and means for recycling textile products back into reusable fibers. By way of background, textile products typically begin as fibers which are then subsequently spun into yarns. The yarns are then woven or knitted, or used in a non-woven arrangement, to make fabric for clothing, upholstery, linens, medical products, etc., or for making textile products such as carpets, rugs, floor coverings, wall coverings, window treatments, etc. In making such textile products, the fibers are often subjected to dyes, sizing, coatings, and other chemical treatments. In the case of carpets, rugs, upholstery, and the like, plastic, rubber, jute, or other backings, underlayments, or interlining materials, may be attached to the fibers. Because of these additional substances which may be incorporated on the fibers in making textile products, such products, once produced, have oftentimes not heretofore been recyclable in a desirable manner on an industrial scale.

Various machines have been patented in the attempt to recycle yarns and fabrics. For example, U.S. Pat. No. 4,126,914, issued to Winch et al., discloses a process and apparatus for treating fibrous materials for subsequent processing and includes use of rolls having teeth thereon in connection with carding plates having toothed clothing thereon for opening fibers. U.S. Pat. No. 4,219,908, also issued to Winch et al., discloses a similar device.

U.S. Pat. Nos. 3,653,094 and 3,797,073, both issued to Fairfield, disclose equipment for processing tangled thread waste. U.S. Pat. No. 4,217,680, issued to Holloway, Jr. et al., discloses a device for processing yarn, cord, and fabric. U.S. Pat. No. 5,331,801, issued to Heifetz, discloses a process for recycling yarns and other spun textile waste.

U.S. Pat. No. 5,481,864, issued to Wright, discloses a cloth scrap recycling method involving moistening fiber scraps prior to opening and blending with virgin fibers. *Textile Yarns—Technology, Structure, and Applications* (pages 313–314) discusses processing of hard waste, which includes a machine for opening material by loosening and disentangling waste thread.

U.S. Pat. No. 3,605,196, issued to Wise et al., discloses a machine for opening waste fibers such as cotton, wool, and asbestos. U.S. Pat. No. 3,941,530, issued to Platt, discloses a device for converting non-woven fabric into staple fibers. U.S. Pat. No. 4,852,217, issued to Bernhardts et al., discloses a carder for forming matted non-woven materials.

U.S. Pat. No. 4,484,377, issued to Morel, discloses a machine which shreds textile wastes to obtain fibers for making threads, insulation, padding, etc.

U.S. Pat. No. 3,289,266, issued to Brown, Jr. et al., discloses a device for processing waste roving.

The present invention seeks to provide not only a process and machinery for recycling yarns into reusable fibers, but also for recycling finished textile products, such as woven and non-woven fabrics, carpeting, upholstery, hard thread waste (yarns to which sizing or other coating has been applied), and the like, on a mechanized basis. In one preferred embodiment discussed in detail below, carding plates, or segments, are used having granular carding surfaces in a novel manner.

Granular carding surfaces have been patented. For example, U.S. Pat. No. 133,638, issued to Ferguson, shows a rub roller for a carding machine, wherein the rub roller includes a covering of sand, emery, or other suitable granular surface. U.S. Pat. No. 3,057,020, issued to McLeod, discloses use of granular carding medium as a covering for revolving carding flats. U.S. Pat. No. 2,879,549, issued to Miller et al., discloses a carding device wherein granular surfaces are provided on carding flats. U.S. Pat. No. 1,235,949, issued to Whitin, discloses a cotton reclamation waste process utilizing a carding machine having a plurality of rolls.

As set forth below, the present invention's use of granular carding surfaces provides new potential to the recycling of textile products.

SUMMARY OF THE INVENTION

It is, therefore, a principal object of this invention to provide a machine for recycling finished and unfinished textile products into reusable fibers.

Another object of the present invention to provide a method of recycling finished and unfinished textile products into reusable fibers.

Another object of the present invention is to provide a machine for recycling a roll of textile products, wherein such products are fed directly into the machine from the roll.

Yet another object of the present invention is to provide textile carding plates having granular working surfaces thereon.

A further object of the present invention is to provide a carding plate having wire clothing disposed in rows at predetermined angles.

Still another object of the present invention is to provide a method for applying a granular surface to textile carding plates.

Generally, the present invention includes a machine for receiving woven and non-woven fabric, carpets, rugs, upholstery, clothing, and other textile products, and for outputting usable, opened fibers which can be used in downstream conventional textile equipment for producing new textile articles. The machine includes an intake conveyor for delivering textile articles to a series of rotating wire clothed rollers. Alternately, if the material to be recycled is in roll form, a roll supporting system can be used for supporting the roll to allow the material to be fed into the machine directly from the roll.

The material is fed into the machine between a feed plate roller and a feed plate and then passes to the first of the series of wire wound rollers. The material is shredded and opened by the machine for separating the fibers by the series of wire wound rollers, and is also subjected to a pair of stationary carding plates, or segments, having concave working surfaces.

The leading carding segment of each pair is preferably clothed with wire teeth, and the trailing carding segment of each pair is preferably covered with a granular surface, such as sandpaper-type material. The metallic clothing of the carding segments serves to aggressively shred the incoming material for separating and opening the fibers. The granular surface provides a less aggressive interface, but still provides a moderate carding action believed to be less damaging to the fibers. The granular surface carding segments also serve to contain the fibers against the wire wound rolls as the fibers pass through the machine.

The respective speeds of the wire wound rollers increase from the intake to the output side of the machine, and a smooth carding segment is provided adjacent the output of the machine and includes an air dam portion for assisting in the air doffing of the fibers from the final wire wound roller.

Two independently operating belt drive systems are provided for powering alternating ones of the wire wound rolls. Further, a debris conveyor is provided for collecting and removing debris removed from the fibers as they pass through the machine.

A method of applying a sandpaper-type material to the concave surface of a carding segment is also disclosed, as is also the provision of metallic card clothing on a carding segment at an opposite angle with respect to the angle at which the wire is wound onto the wire wound rollers.

BRIEF DESCRIPTION OF THE DRAWINGS

The foregoing, as well as other objects of the present invention, will be further apparent from the following detailed description of the preferred embodiment of the present invention, when taken together with the accompanying specification and drawings, in which.

DESCRIPTION OF THE PREFERRED EMBODIMENT

The accompanying drawings and the description which follows set forth this invention in its preferred embodiment. However, it is contemplated that persons generally familiar with textile machinery will be able to apply the novel characteristics of the structures and methods illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout their various views, the textile recycling machine of the present invention is indicated generally in the figures by reference character 10.

Figures 1, 2:
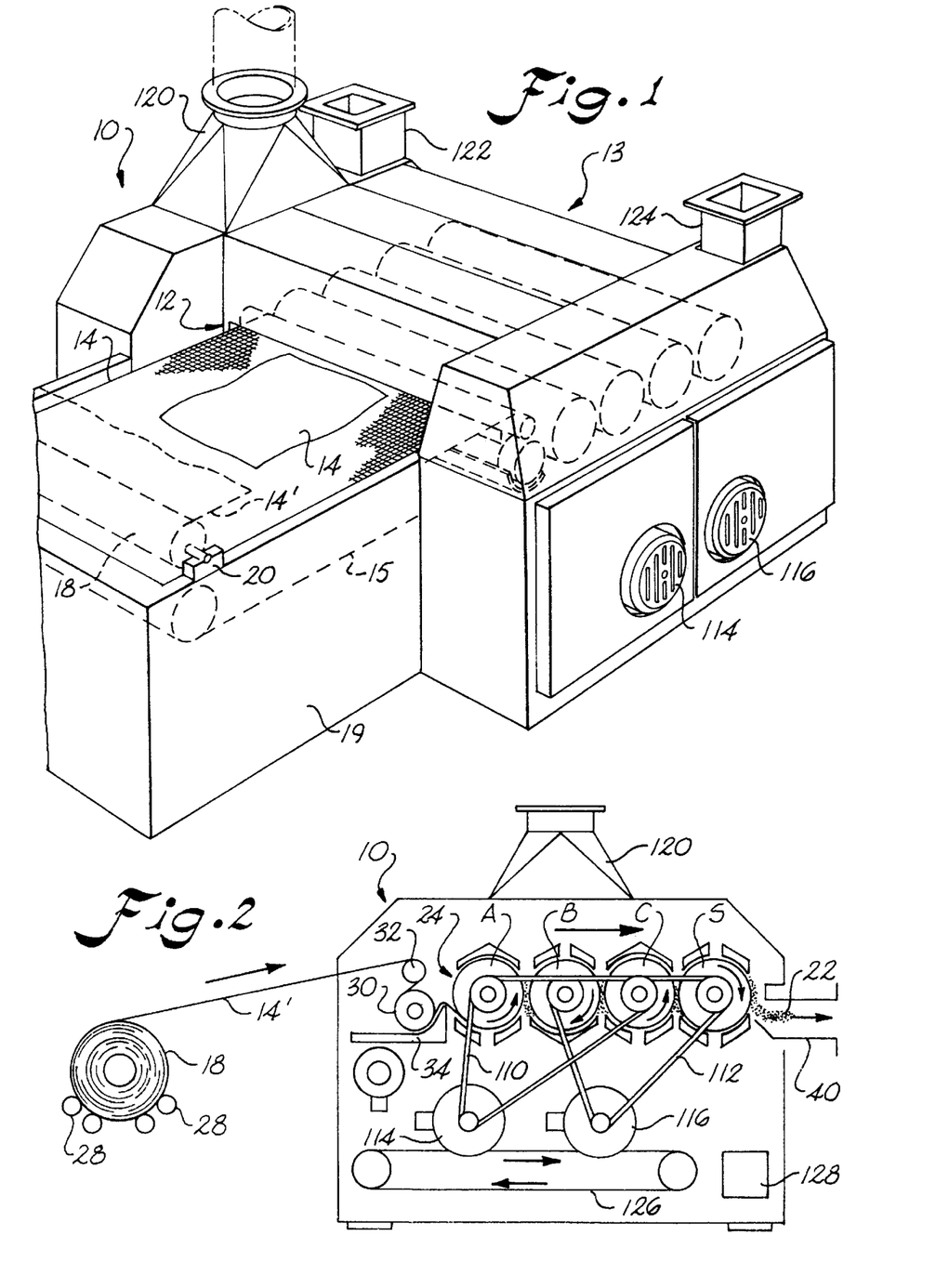
FIG. 1 is a perspective view of a textile recycling machine constructed in accordance with the present invention.
FIG. 2 is a schematic representation of the present invention illustrating an alternate embodiment of a support for a roll of material supporting the roll of textile material.

Turning to FIG. 1, an overview of textile recycling machine 10 will now be given. Recycling machine 10 includes an intake, generally 12, on one side of the machine, and a usable fiber output, generally 13, on the opposite side of the machine. Material 14, which is to be recycled, is fed into intake 12 either in pieces, by being deposited either manually or automatically on to a feed conveyor 15, or if material 14' is carried in roll form on a roll 18, directly into intake 12 from roll 18. Roll 18 is rotatably supported on an inlet stand 19 by bearing members 20 attached to inlet stand 19.

Material 14 is fed into intake 12 in the form of yarns (treated or untreated), woven or non-woven fabric, carpet, upholstery, webbing, or the like, or in other forms containing textile fibers. Such materials are output from output side 13 of machine 10 in the form of usable fibers 22 as shown in FIG. 2. These fibers can then be subsequently used in downstream processes to be reprocessed into other textile goods, or can be blended with virgin fibers to produce textile products containing a desired portion of the recycled fibers. For example, the recycled fibers 22 can be fed into a conventional carding machine, from which a fibrous web is produced and condensed into a sliver. The sliver can then be twisted to form roving, and the roving can then be spun into a yarn. The yarn can then be used for weaving or knitting a desired end product. Alternately, the fibers 22 can be used for making non-woven products.

FIG. 2 illustrates significant portions of the internal workings of machine 10. The shredding of material 14 and the extraction of the fibers 22 therefrom is accomplished by wire clothed rollers, generally 24. Four rollers, A, B, C, and S, are preferably provided within machine 10, although it is to be understood that more or less rollers 24 could be used, if desired, to achieve differing results. Rollers 24 are clothed with conventional wire clothing or are provided with a granular surface, such as sandpaper, instead, which will be discussed in further detail below.

Material 14' is shown in FIG. 2 as being unwound from a roll 18 of material using an alternate embodiment of a roll supporting system. The embodiment shown in FIG. 2 includes supporting roll 18 on four freely rotatable support rolls 28. Generally, such support rolls 28 would be non-powered and would turn passively in response to the payout of material 14' from roll 18, as material 14' is drawn into machine 10. Alternately, support rolls 28 could be powered (not shown), should such control of the payout of roll 18 be desired or should the required force to turn roll 18 be so great that it impeded the drawing end of material 14' into machine 10. This drawing-in of material 14' is accomplished primarily by the rotation of a feed plate roller 30 and by roller A, which pull material 14' over an intake roller 32 and under feed plate roller 30. The material 14' is directed upwardly as it exits feed plate roller 30 by the upward contour of a feed plate 34. The material 14' then passes under roller A, over roller B, under roller C, and over roller S as it is being reduced into usable opened fibers by those rollers, to the extent that the material 14', which may enter machine 10 in the form of fibers, yarns, or a finished textile product, exits machine 10 at outlet chute 40 in the form of fibers 22.

Figure 3:
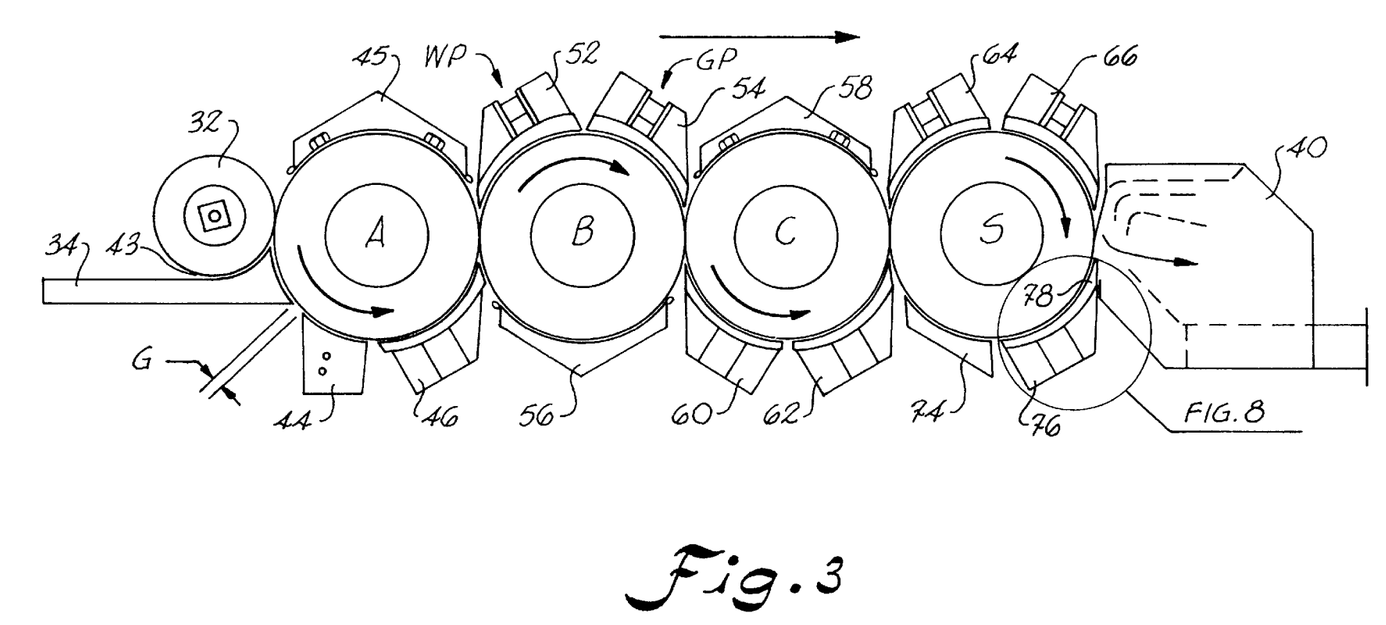
FIG. 3 is a partial side elevational view illustrating carding rollers and carding segments constructed in accordance with the present invention.

FIG. 3 illustrates the arrangement of rollers A, B, C, and S, and also the arrangement of a number of cooperating plates which, as will be described, serve to, among other things, constrain the fibers being drawn from material 14 about rollers A, B, C, and S as the fibers pass between those rollers and ultimately to outlet 40. Upon entering the nip 43 between feed plate roller 32 and feed plate 34, the material 14 is carried by roller A past the end of feed plate 34 and onward to an adjustable plate 44. Adjustable plate 44 includes a generally smooth concave surface spaced from the wire clothing of roller A. Between the end of feed plate 34 and adjustable plate 44, is an adjustable gap G. Gap G can be adjusted as desired to allow for varying amounts of product, trash, and/or debris removal from material 14 as it is worked about roller A through the carding and opening action provided by wire clothing on roller A and the cooperating plates. A smooth plate 45 is provided above roller A to keep the fibers and air flow in close adherence to the circumference of roller A as roller A rotates. An additional smooth plate segment 46 is provided beneath roller A adjacent adjustable plate 44. Both smooth plates 45 and 46 include concave surfaces for cooperating with the circumference of roller A.

As the fibers from material 14 travel around roller A, they are picked up by roller B and are brought by the wire clothing on roller B into a working carding relationship with carding plates, generally WP. Carding plate 52 is one such plate WP and includes a wire clothed concave surface for cooperating with roller B. The interaction between the wire clothing of carding plate 52 and roller B serves to card and open the fibers, the fibers next being carried into a working relationship with a carding plate 54.

Carding plates, generally GP, are provided having granular carding surfaces, and carding plate 54 is one such plate GP and includes a concave inner surface onto which a granular profile is attached. This granular surface, which is preferably in the form of flexible-backed sandpaper, serves to hold the fibers against roller B and to align the fibers in a carding fashion. However, because the granular coating presents a less aggressive surface to the fibers than does typical wire clothing, the fibers are worked less, and it is believed that less damage is imparted to the fibers as they are carried by granular coated plate 54. On the underside of roller B, a smooth carding plate 56 is provided, and a similar such smooth plate 58 is provided above roller C.

As the fibers pass beneath roller C, they first encounter a wire clothed carding plate 60, similar to carding plate 52, and are then presented to a granular coated carding segment 62, which is similar to granular coated carding segment 54. Instead of a granular coating, segment 62 could be provided with wire clothing instead. As the fibers pass from roller C to roller S, the final roller, they are first subjected to a wire clothed carding segment 64 (which is similar to carding segments 52 and 60) and are then subjected to a granular coated carding plate 66, which is similar to carding plates 54 and 62.

The fibers are then doffed from roller S through use of a suction air doff through chute 40. A smooth carding segment 74 is provided beneath roller S, and a smooth segment 76 is provided adjacent where the fibers 22 are removed, or doffed, from roller S. The smooth segment 76 includes an air dam 78 discussed below, and illustrated in more detail in FIG. 8.

Figure 8:
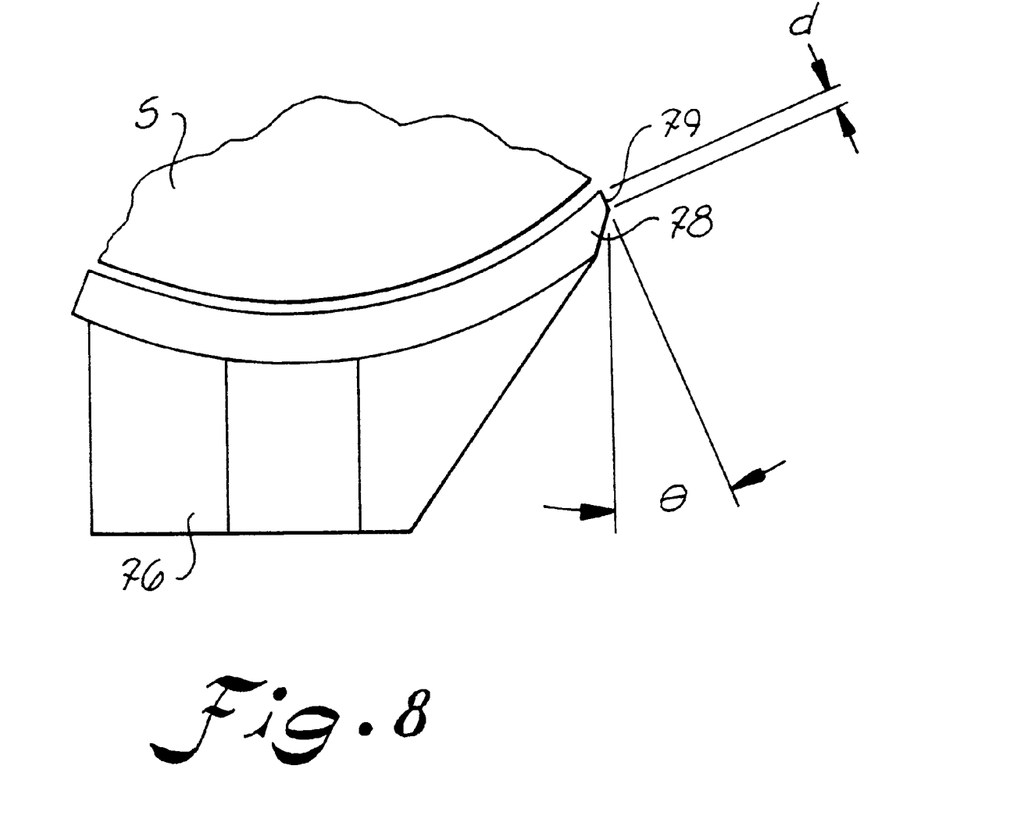
FIG. 8 is a side elevational detail view of an air dam segment constructed in accordance with the present invention and illustrated in FIG. 3.

The carding segments discussed above generally run the full length of the wire clothed rollers A, B, C, and S, and the air dam 78 of carding segment 76 likewise runs substantially the length of roller S. As shown in FIG. 8, air dam 78 includes an angled nose surface 79 which extends downwardly at an angle θ ranging between 20° and 25° from vertical, and angle θ is preferably 23°. Note surface 79 has a width d, which is preferably approximating 0.025 inches.

Figure 4:
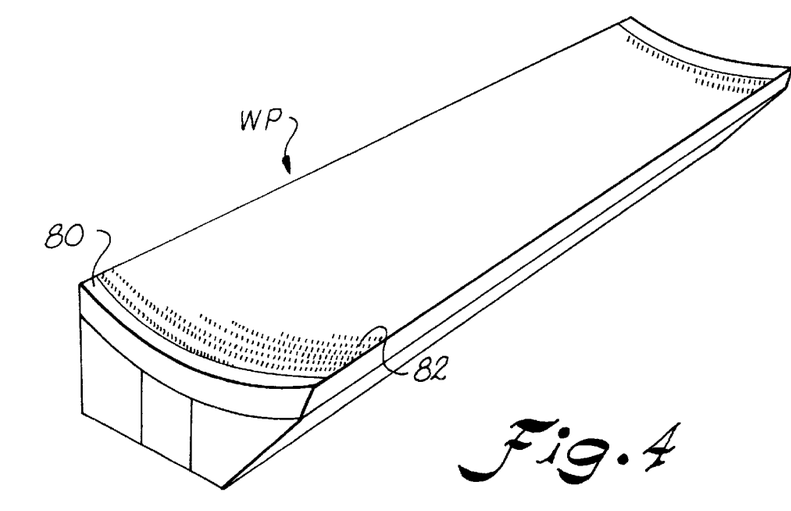
FIG. 4 is a perspective view of a carding segment having wire clothing provided thereon.

FIG. 4 illustrates a typical wire clothed plate WP, such as one of plates 52, 60, 64, having a concave surface 80 to which wire clothing 82 is attached. Carding plates 52, 60, 64 could be CARDMASTER® plates manufactured by John D. Hollingsworth on Wheels, Inc., of Greenville, S.C., or some other suitable wire clothed plates.

Figure 7:
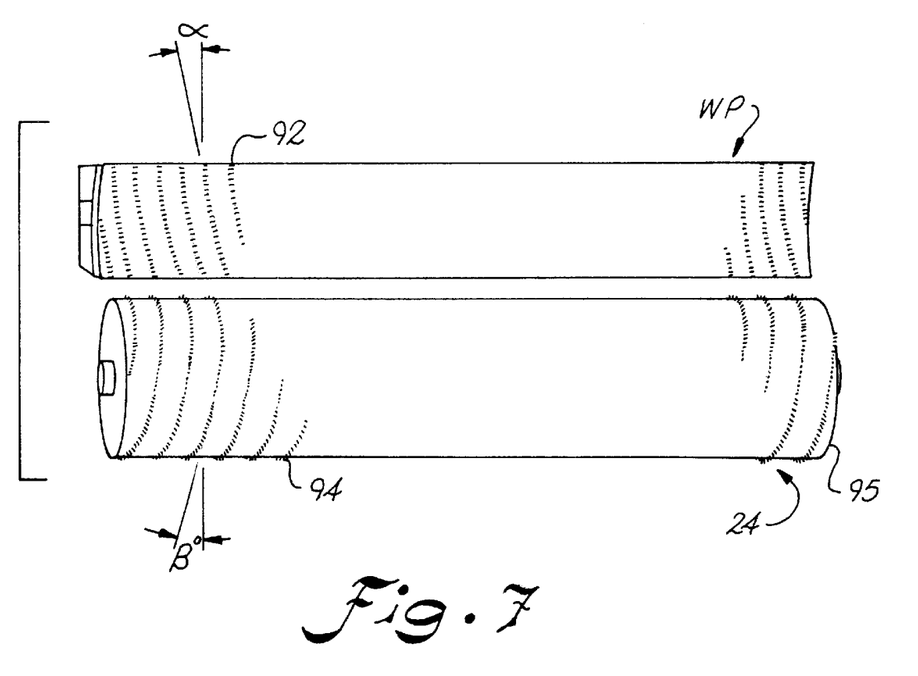
FIG. 7 is a view of a wire wound roll and a wire clothed carding segment constructed in accordance with the present invention.

FIG. 7 illustrates a preferred construction of a wire clothed carding plate WP, wherein the wire clothing 92 is placed on plate WP in side-by-side rows at an angle α with respect to vertical. Angle α is preferably 5°, although it could be several degrees plus or minus 5°, if desired.

Also, the wire clothing 94 on rollers A, B, C, and S is preferably wound onto the circumferential surface of the rolls at a predetermined winding angle β. This angle β is preferably within the range of 1° to 2° from vertical, and is disposed from vertical in the opposite direction as angle α, as is illustrated in FIG. 7. By having wire clothing 94 on rollers A, B, C, and S angled in the opposite direction from the direction of wire 92 on segments WP, fibrous material being worked by the rollers and carding segments tends to not migrate off the ends of the rolls. This could occur because the angle β of the wire on the rolls may cause the fibrous material being worked to tend to migrate toward end 95 of a roll. By having the clothing angled in the opposite direction on a cooperating carding segment, the migration of the fibers toward end 95 is generally arrested and controlled, such that the fibers better utilize the full working length of the circumference of the carding rollers A, B, C, and S, through machine 10. It is to be understood, however, that wire clothing 92 provided on carding segment WP could be straight, i.e., angle α being 0 from vertical, if desired, and in such case, clothing 92 would not be angled and would run generally parallel to the direction of fiber flow through machine 10.

Figure 5:
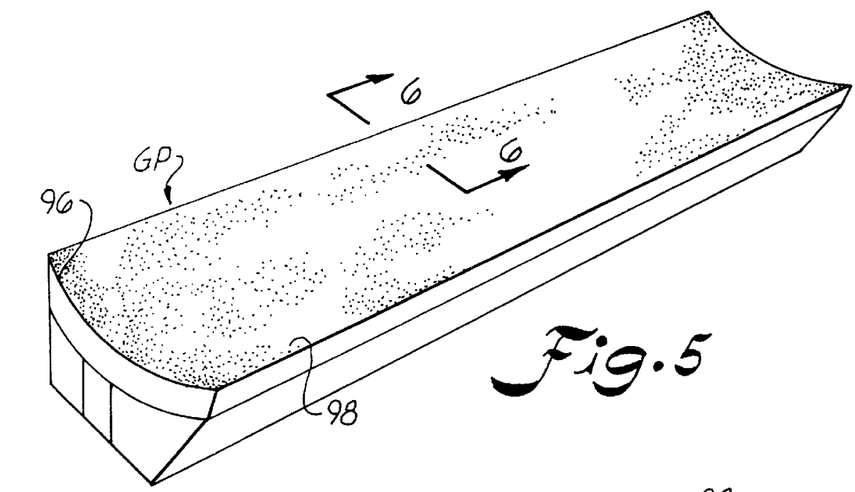
FIG. 5 is a perspective view of a carding segment having a granular surface provided thereon.

FIG. 5 illustrates the concave surface 96 of a typical granular coated carding plate GP. The granular coating could be sand, aluminum oxide, tungsten, or some other very hard material typically used on sandpaper and other abrasive materials. The purpose of the granular coated plates being to provide a carding interface which is less aggressive than the wire clothed segments WP. It is to be understood, however, that concave surface 96 could be grooved, or have a roughened surface finish, instead of the granular material 98 disclosed herein, if desired, and that the term "granular surface" is not meant to limit the present invention to sandpaper or other specific abrasive materials.

The purpose of carding plate GP is to provide a roughened, less aggressive surface to the fibers in a trailing position behind the wire clothed plates WP, and such roughened, less aggressive surface can be provided to plates GP in a variety of ways, that surf ace being provided in a preferred embodiment using flexible-backed abrasive material referred to herein for the sake of simplicity as "sandpaper."

The present invention also includes a method for attaching such sandpaper to a carding plate GP. It is noted that sandpaper is often wound into rolls after manufacturing, wherein the abrasive portion of the sandpaper is disposed on the outside of the roll. This presents a problem when trying to attach the sandpaper to a concave surface, with the abrasive portion extending outwardly, because the sandpaper is then placed in reverse curvature with respect to how it was manufactured and transported on a roll.

Figure 6:
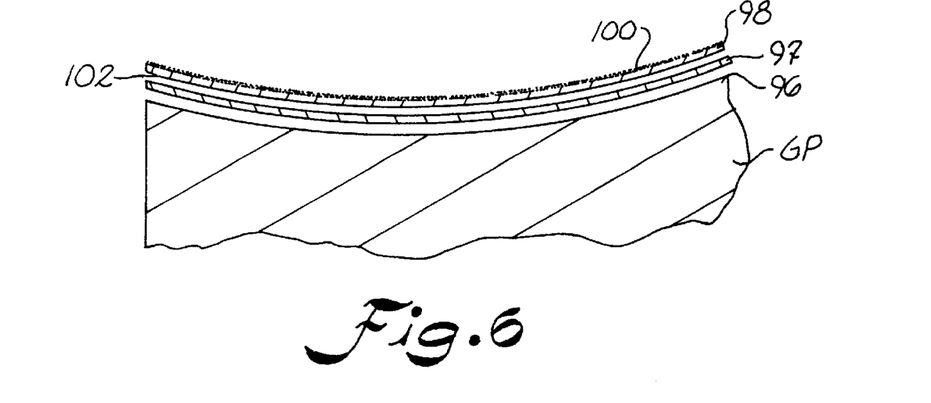
FIG. 6 is an exploded view taken along lines 6—6 of FIG. 5.

A process of the present invention for attaching the sandpaper to a concave surface 96 includes first heating the carding plate GP to 120° F. Then, a layer of double-sided adhesive material 97, such as PSA (pressure-sensitive adhesive) made by Adhesive Resources of Fridley, Minn., is then attached to the concave surface 96 of the plate. Then, sandpaper 98 having grit 100 on one side and an adhesive surface 102 on the other side is placed such that the adhesive surface 102 seats upon the intermediate, or underlayment, layer 97. The sandpaper is preferably fabric-backed and has a grit of between 24 and 80 grit. After the sandpaper is attached to the underlayment layer 97, it preferably is allowed to set for approximately 12 hours before being put into use.

As noted above, machine 10 preferably includes four wire wound rolls A, B, C, and S. During operation, roll A rotates within a range of 1500 to 2500 rpm, and preferably at approximately 2000 rpm; roll B rotates in a range between 2200 and 3200 rpm, and preferably at approximately 2700 rpm; roll C rotates within a range of approximately 2900 to 3900 rpm, and preferably at approximately 3400 rpm; and roll S rotates within a range of 3700 to 4700 rpm, and preferably at approximately 4200 rpm. Conventional steel wire clothing is used on rolls A, B, C, and S, with roller A having the most coarse wire, and the wire coarseness of rolls B and C decreasing with respect to one another, such that roll S has the most fine wire of all of the rolls.

The wire clothing used on the wire clothed carding plates WP is preferably a finer type of wire, and would be generally similar to the wire used on roll S. However, a variety of configurations of wire could be used on plates WP and rollers A, B, C, and S, dependent upon the desired results.

Rollers A, B, C, and S are driven by belts 110 and 112. Belt 110 is powered independently of belt 112 by motor 114, and belt 110 drives rollers A and C. Belt 112 is powered independently by belt 110 by motor 116, and belt 112 drives rollers B and S. The independent driving of rolls A and C and of rolls B and S allows for the respective drive speeds of such rolls to be selectively varied as desired.

Typically, the clearances between the wire clothing of rolls A, B, C, and S with respect to the carding plates 42 would be within the range of 0.022 and 0.040 inches.

Recycling machine 10 further includes suction plenum 120 for removal of non-reusable trash and fibers and also includes plenums 122, 124 for additional trash and fiber removal. A debris conveyor 126 is provided for receiving debris and trash which falls downwardly during fiber opening, and the conveyor 126 transports the debris to a suction exhaust duct 128.

Although machine 10 has been shown and discussed as having granular coated carding plates at specific locations, it is to be understood that the positions of the granular coated plates GP and the wire coated plates WP could be reversed, if desired. Also, more or less granular coated plates GP and wire coated plates WP could be provided, or in the alternative, all of the carding plates could be provided with granular surfaces, with no carding plate carrying carding wire. Furthermore, one or more of rollers A, B, C, and S could be provided with a granular surface instead of wire clothing. A concept of the present invention is that the granular carding surfaces provide a less aggressive profile, and, therefore, less damage to fibers passing through machine 10, while still providing a certain amount of carding action for aligning fibers and for allowing separation of debris, coatings, etc. from the fibers as they pass through machine 10. For example, in certain applications, it may be desired to have all roll and plate carding surfaces provided with granular surfaces.

Consequently, the present invention covers use of a granular surface or surfaces in carding interfaces in conjunction with wire clothed surfaces, regardless of whether the granular surface moves with respect to a stationary wire clothed surface (such as would be the case with a wire clothed carding segment), or the wire clothed surface moves with respect to a stationary granular surface (such as would be the case with a granular coated carding segment), or in the case of where a wire clothed surface and a granular surface move at differing rates with respect to one another (which would be the case, for example, where a metallic clothed carding cylinder moved in respect to granular coated moving carding flats, or vice versa).

It is noted that the present recycling machine 10 can be used to recycle finished rugs or carpet, whether rubber-backed, jute-backed, resin-backed, synthetic material-backed, and the like. Machine 10 can also be used to recycle hard thread waste, i.e., threads which have already been woven or knitted into fabrics, or subjected to sizing or some other chemical treatment or coating.

While preferred embodiments of the invention have been described using specific terms, such description is for a present illustrative purposes only, and it is to be understood that changes and variations to such embodiments, including, but not limited to, the substitution of equivalent features or parts, and the reversal of various features thereof, may be practiced by those of ordinary skill in the art without departing from the spirit or scope of the disclosure.

What is claimed is:

1. A fiber reclamation apparatus, comprising:
   a frame;
   a motor connected to said frame;
   at least one metallic clothed carding roll carried for rotation by said frame, said motor being drivingly connected to said metallic clothed carding roll;
   at least one granular clothed carding roll carried for rotation by said frame, said motor being drivingly connected to said granular clothed carding roll;
   said metallic clothed roll and said granular clothed carding roll forming a nip zone therebetween with an input side for receiving and working fibers to be reclaimed and an output side for outputting the fibers; and
   at least one carding segment connected to said frame and carried adjacent said metallic clothed carding roll for receiving and working therebetween fibers to be reclaimed, and at least one carding segment connected to said frame and carried adjacent said granular clothed carding roll for receiving and working therebetween fibers to be reclaimed.

2. A fiber reclamation apparatus as defined in claim 1, wherein said at least one metallic clothed carding roll includes three metallic clothed carding rolls adjacent to one another.

3. A fiber reclamation apparatus as defined in claim 2, wherein said three metallic clothed carding rolls are configured to transport the fibers to said at least one granular clothed carding roll.

4. A fiber reclamation apparatus as defined in claim 1, further comprising a granular clothed carding segment and a metallic clothed carding segment positioned adjacent to one another.

5. A fiber reclamation apparatus as defined in claim 4, further comprising at least one metallic clothed carding segment generally diametrically opposed to said granular clothed carding segment.

6. A fiber recycling machine as defined in claim 4, wherein said granular clothed carding segment is downstream of said metallic clothed carding segment such that said metallic clothed carding segment receives fibers prior to said granular clothed carding segment receives the fibers.

7. An apparatus for reclaiming fibers from a roll of fabric material, the apparatus comprising:
   a frame;
   at least two carding rolls connected to said frame for rotation relative to said frame, said carding rolls defining a nip zone therebetween for drawing in the fabric material and for removing fibers therefrom;
   means for supporting the roll of fibrous material for free rotation as said material is drawn into said nip zone; and
   an intake roller rotatably connected to said frame for contacting and guiding the material from the roll of fabric material to said nip zone.

8. The apparatus as defined in claim 7, wherein said intake roller is configured for placing in tension the material between the roll of fabric material and said intake roller.

9. The apparatus as defined in claim 7, wherein said means for rotatably supporting the roll of fabric material includes a shaft connected to said frame, said shaft passing longitudinally through the roll for supporting the roll for rotation relative to said frame.

10. The apparatus as defined in claim 7, wherein said means for rotatably supporting the roll includes at least two support rolls for supporting the roll from the outer surface of the roll.

11. The apparatus as defined in claim 7, further comprising an air doffing device for use with at least one of said carding rolls for removing fibers therefrom, the air doffing device including:
    an elongated member positioned adjacent and having a transverse curvature corresponding to the curvature of said at least one carding roll; said elongated member defining an air dam with an angled nose surface adjacent said at least one carding roll for reducing air flow between said elongated member and said at least one carding roll; and
    a suction chute for removing fibers from said at least one carding roll as the fibers approach said air dam.

12. The air doffing device as defined in claim 11, wherein said transverse curvature of said elongated member is generally smooth.

13. The apparatus as defined in claim 7, further comprising:
    at least one of said carding rolls having elongated strands of metallic clothing wound thereon in a generally helical angle angled in a first transverse direction; and
    a carding segment mounted adjacent said carding roll for forming a carding interface therebetween, said carding segment having rows of wire clothing thereon angled in a second transverse direction, said second transverse direction being opposite to said first transverse direction.

14. The carding combination as defined in claim 13, wherein angle of said rows of wire clothing is approximately 5 degrees from vertical.

15. A fiber reclamation machine for reclaiming fibers from fibrous materials, the machine comprising:
    a frame;
    first, second, third, and fourth fiber working rolls carried for rotation by said frame; said first and second rolls forming a first nip zone therebetween, said second and third rolls forming a second nip zone therebetween, and said third and fourth rolls forming a third nip zone therebetween;
    drive means connected to said frame for driving said first, second, third, and fourth fiber working rolls; and
    a first drive belt connected to said drive means and said first and third rolls for driving said first and third rolls, and a second drive belt connected to said drive means and said second and fourth rolls for driving said second and fourth rolls; said first and second drive belts being independent of one another such that the respective drive speeds of said first and third fiber working rolls and said second and fourth fiber working rolls may be selectively varied.

16. The fiber reclamation machine as defined in claim 15, further comprising an air doffing device for use with said fourth fiber working roll for removing fibers therefrom, the air doffing device including:
    an elongated member positioned adjacent to and having a transverse curvature corresponding to the curvature of said fourth fiber working roll; said elongated member defining an air dam with an angled nose surface adjacent said fourth fiber working roll for reducing air flow between said elongated member and said fourth fiber working roll; and
    a suction chute for removing fibers from said fourth fiber working roll as the fibers approach said air dam.

17. The fiber reclamation machine as defined in claim 15, further comprising:
    at least one of said fiber working rolls having elongated strands of metallic clothing wound thereon in a generally helical angle angled in a first transverse direction; and
    a carding segment mounted adjacent said at least one carding roll for forming a carding interface therebetween, said carding segment having rows of wire clothing thereon angled in a second transverse direction, said second transverse direction being opposite to said first transverse direction.

18. The fiber reclamation machine as defined in claim 15, wherein said drive means includes two motors.

19. A fiber reclamation apparatus for reclaiming fibers from a roll of fibrous material, the apparatus comprising:
    a frame;
    a motor connected to said frame;
    at least one metallic clothed carding roll carried for rotation by said frame, said motor being drivingly connected to said metallic clothed carding roll;
    at least one granular clothed carding roll carried for rotation by said frame, said motor being drivingly connected to said granular clothed carding roll;
    said metallic clothed roll and said granular clothed carding roll forming a nip zone therebetween with an input side for receiving and working fibers to be reclaimed and an output side for outputting the fibers; and
    at least one first carding segment connected to said frame and carried adjacent said metallic clothed carding roll for receiving and working therebetween fibers to be reclaimed, and at least one second carding segment connected to said frame and carried adjacent said granular clothed carding roll for receiving and working therebetween fibers to be reclaimed;
    means for rotatably supporting the roll of fibrous material as said material is fed into said input side of said nip zone;
    an intake roller rotatably connected to said frame for guiding the fibrous material from the roll of fibrous material to said input side of said nip zone;

an elongated member positioned adjacent and having a transverse curvature corresponding to the curvature of said granular clothed carding roll; said elongated member defining an air dam with an angled nose surface adjacent said granular clothed roll for reducing air flow between said elongated member and said granular clothed roll;

a suction chute for removing fibers from said granular clothed roll as the fibers approach said air dam;

said metallic clothed carding roll having elongated strands of metallic clothing wound thereon in a generally helical angle angled in a first direction; and said second carding segment having rows of wire clothing thereon angled in a second direction, said second direction being opposite to said first direction.

* * * * *